(12) United States Patent
Xu et al.

(10) Patent No.: US 9,716,436 B2
(45) Date of Patent: Jul. 25, 2017

(54) SOFT START CONTROLLER OF A CONVERTER

(71) Applicant: TEXAS INSTRUMENTS INCORPORATED, Dallas, TX (US)

(72) Inventors: Xiaojun Xu, Beijing (CN); Nan Jiang, Beijing (CN); Xianhui Dong, Beijing (CN)

(73) Assignee: Texas Instruments Incorporated, Dallas, TX (US)

( * ) Notice: Subject to any disclaimer, the term of this patent is extended or adjusted under 35 U.S.C. 154(b) by 127 days.

(21) Appl. No.: 14/630,902

(22) Filed: Feb. 25, 2015

(65) Prior Publication Data
US 2016/0118888 A1  Apr. 28, 2016

Related U.S. Application Data

(63) Continuation of application No. PCT/CN2014/089453, filed on Oct. 24, 2014.

(51) Int. Cl.
*H02M 1/36* (2007.01)
*H02M 3/158* (2006.01)
*H02M 1/00* (2006.01)

(52) U.S. Cl.
CPC ........... *H02M 3/1588* (2013.01); *H02M 1/36* (2013.01); *H02M 3/158* (2013.01); *H02M 2001/0009* (2013.01)

(58) Field of Classification Search
CPC ........ H02M 1/36; H02M 3/156; H02M 3/158; H02M 3/1588
See application file for complete search history.

(56) References Cited

U.S. PATENT DOCUMENTS

| 7,045,992 | B1 * | 5/2006 | Silva | H02M 1/36 323/222 |
| 7,482,795 | B2 * | 1/2009 | Parto | H02M 1/36 323/224 |
| 7,498,787 | B2 | 3/2009 | Leung et al. | |
| 8,115,523 | B2 | 2/2012 | Lynch | |
| 8,427,130 | B2 | 4/2013 | Brokaw | |

(Continued)

FOREIGN PATENT DOCUMENTS

| CN | 101741233 | 6/2010 |
| CN | 103441658 | 12/2013 |

*Primary Examiner* — Fred E Finch, III
(74) *Attorney, Agent, or Firm* — Goutham Kondapalli; Charles A. Brill; Frank D. Cimino

(57) ABSTRACT

A DC-to-DC converter includes first and second switches. If on, the first switch provides a signal path through a common node to an output voltage node. If on, the second switch provides a signal path through the common node to the output voltage node. Control logic provides first and second control signals to control the first and second switches. A node produces a first voltage that ramps up from zero during initialization, and a soft start controller controls the second control signal while the first voltage is not greater than a predefined level. While the first voltage is not greater than the predefined level, the soft start controller keeps the second control signal at a higher level to maintain on the second switch, and transitions the second control signal to a lower level only when the first control signal transitions from a lower level to a higher level.

17 Claims, 3 Drawing Sheets

(56) References Cited

U.S. PATENT DOCUMENTS

| | | | | |
|---|---|---|---|---|
| 2004/0169498 A1* | 9/2004 | Goder | ............... | H02M 1/36 323/222 |
| 2005/0035748 A1* | 2/2005 | Inn | ............... | H02M 3/1588 323/285 |
| 2008/0238397 A1* | 10/2008 | Chen | ............... | H02M 1/36 323/288 |
| 2011/0205764 A1* | 8/2011 | Sheng | ............... | H02M 1/36 363/21.09 |
| 2012/0049829 A1* | 3/2012 | Murakami | ............... | H02M 1/32 323/288 |
| 2012/0091978 A1* | 4/2012 | Ishii | ............... | H02M 1/36 323/271 |

\* cited by examiner

US 9,716,436 B2

SOFT START CONTROLLER OF A CONVERTER

CROSS-REFERENCE TO RELATED APPLICATION

This is a continuation of copending International Application No. PCT/CN2014/089453, with an international filing date of Oct. 24, 2014, which designated the United States and is hereby fully incorporated herein by reference for all purposes.

BACKGROUND

A known way to protect a voltage converter during startup or restart of the voltage converter is to provide a "soft start" process. A voltage converter using the soft start process is generally implemented by linearly increasing a pulse width of a pulse width modulated (PWM) signal until a voltage level at an output voltage node of the voltage converter reaches a predefined level. By using the soft start process, the voltage converter may avoid excessive heating or failure during initialization.

SUMMARY

Systems and methods to control an output voltage level of a DC-to-DC converter during a soft start process are disclosed herein. In an embodiment, a DC-to-DC converter includes a first switch connected to an input voltage and a common node and, if on, the first switch provides a signal path through the first switch and through the common node to an output voltage node of the DC-to-DC converter, and a second switch connected to ground and the common node and, if on, the second switch provides a signal path through the second switch and through the common node to the output voltage node of the DC-to-DC converter. The DC-to-DC converter further includes a control logic coupled to the first and second switches, a first node, a first soft start controller. More specifically, the control logic is configured to provide a first and second control signals to control the first and the second switches respectively. The first node is usable to produce a first voltage that ramps up from zero during initialization, and the soft start controller is configured to control the second control signal while the first voltage is not greater than a predefined level. Moreover, while the first voltage is not greater than the predefined level, the first soft start controller keeps the second control signal at a higher level to maintain on the second switch, and transitions the second control signal to a lower level only at the time when the first control signal transitions from a lower level to a higher level.

In another embodiment, a voltage regulator includes an input voltage node, an output voltage node, a first switch connected to the input voltage and a common node, a second switch connected to ground and the common node, a first node, a control logic, a first soft start controller coupled to the control logic, and a second soft start controller coupled to the control logic. If the first switch is on, the first switch provides a signal path through the first switch and through the common node to the output voltage node of the voltage regulator. Analogously, if the second switch is on, the second switch provides a signal path through the second switch and through the common node to the output voltage node of the voltage regulator. The first node is usable to produce a first voltage that ramps up from zero during initialization. The control logic configured to provide a first and a second control signals to control the first and second switches respectively. The first soft start controller is configured to determine the second control signal while the first voltage is less than a predefined level, and the second soft start controller is configured to determine the first and second control signals while the first voltage is greater than the predefined level. More specifically, while the first voltage is less than the predefined level, the first soft start controller keeps the second control signal at a higher level before the first control signal transitions from a lower level to a higher level, and transitions the second control signal to the lower level only at the time when the first control signal transitions from a lower level to a higher level.

In a further embodiment, a method includes receiving, by a soft start controller, voltage levels at an input voltage node and an output voltage node of a DC-to-DC converter. The method further comprises while a voltage level of a first node of the DC-to-DC converter is less than a predefined level, determining, by the soft start controller, a slope of a line that represents a difference of voltage levels at the input voltage node and the output voltage node of the DC-to-DC converter. The method still further includes based on the slope, determining, by the soft start controller, a low side duty cycle of a low side control signal which is configured to control a low side switch of the DC-to-DC converter, and controlling, by the soft start controller, a falling edge of the low side control signal to align with a rising edge of a high side control signal.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
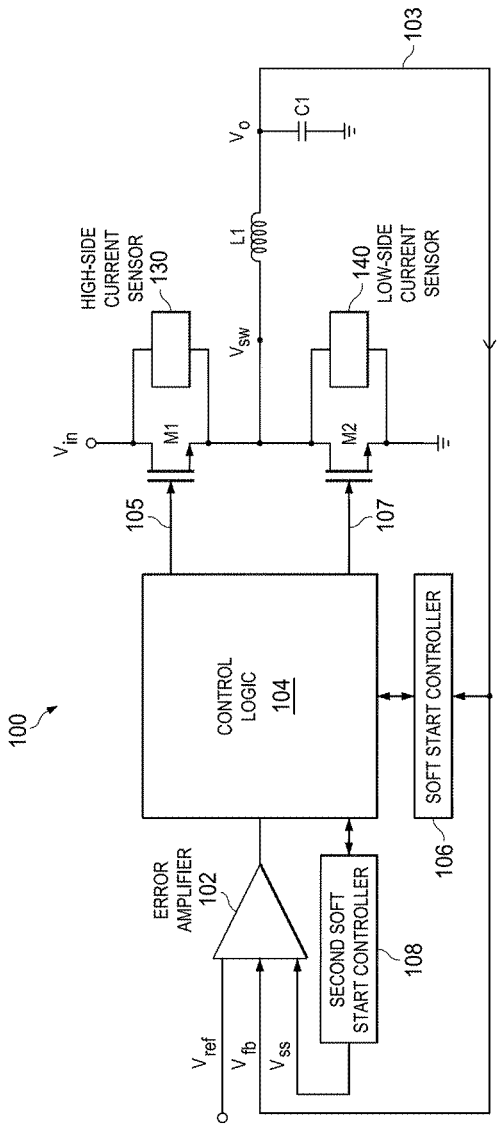
FIG. 1 shows a block diagram of a DC-to-DC voltage converter including a soft start controller in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

To meet the ever-increasing demand for high speed and miniaturization of electronic devices (e.g., voltage converters), microelectronic circuit voltage levels have been reduced accordingly. In this regard, many electrical voltage converters use synchronous rectification (i.e., using a synchronous rectifier) to control the output voltage level. Using a synchronous rectifier may not only meet the demand for operating under a low-voltage level, but does so with increased efficiency.

A voltage converter with a synchronous rectifier means that the voltage converter uses an actively controlled switch such as a transistor, usually a power metal oxide field effect transistor (MOSFET) or a power bipolar junction transistor (BJT), to control a characteristic of the converter. In one example, the characteristic to be controlled is an output voltage level of the converter.

Typically, a pair of switches coupled in series are switched on and off alternately to further control the output voltage level of the converter. More specifically, a first switch is connected to an input voltage and a common node, and a second switch is connected to the common node and ground. While the first switch is on (and the second switch is concurrently off), the first switch is configured to couple the input voltage to an output voltage node by providing current flow to an inductor connected between the common node and the output voltage node. The current flow provided through the first switch is thus stored in the inductor. On the other hand, while the second switch is on and the first switch is off, ground is coupled to the common node by way of the second switch, resulting in a discharging path of the stored current flow via the second switch. By alternately switching on and off the coupled switches of a voltage converter with a particular duty cycle, the input voltage may be stepped up and/or down to a voltage level at the output voltage node.

In general, the switches are controlled via a pulse width modulated (PWM) signal. In the example in which the switches are implemented as power MOSFETs, a PWM signal may be applied to a gate terminal of each MOSFET so as to turn on and off the MOSFETs. The PWM signal is a characteristic with a duty cycle to alternately transition between a higher value and a lower value. As such, the switches being controlled by the PWM signal may be turned on and off accordingly. A duty cycle is a percentage of one period in which a signal is active. A period of a periodic signal is the amount of time needed for the signal to complete one cycle.

In order to avoid excessive heating or failure of the voltage converter during initialization (i.e., startup), the PWM signals to drive the switches usually transition through a soft start process. During a soft start, conventionally, the duty cycle of the first switch (D1) gradually increases, and accordingly the duty cycle of the second switch (D2) varies with the duty cycle of the first switch. More specifically, the duty cycle of the second switch varies with the duty cycle of the first switch in a complementary fashion, which means that D2=1−D1. This may cause a non-monotonic startup (i.e., an undershoot and/or overshoot) of the output voltage level of the voltage converter, especially when the voltage converter is pre-biased. When a voltage converter is pre-biased, it means that at the moment that the voltage converter is switched on, there already exists a nonzero voltage level at the voltage converter's output voltage node.

Generally, a current sensor coupled to a switch is configured to sense or monitor a current level flowing from the switch to a load (e.g., an output inductor) and if the current level is greater than a threshold, the switch may be forced to shut off in order to prevent damage, such as a current overload condition, to the voltage converter.

Embodiments of the disclosed invention provide systems and methods to selectively control the duty cycles of the first and second switches of the voltage converter. Further, by precisely controlling an alignment of the duty cycles for the first and second switches during the soft-start process, the disablement of the current sensor may be circumvented. Still further, a variable slope of a ramp up of the soft start voltage may advantageously cause the voltage converter to be started up monotonically while the voltage converter is pre-biased.

In a preferred embodiment, the voltage converter is implemented as a direct current-to-direct current (DC-to-DC) buck converter. A buck converter is a voltage step down converter. However, other converter architectures may also be used such as a DC-to-DC boost converter, a forward converter, a flyback converter or any other suitable converter.

FIG. 1 shows a top-level block diagram of a DC-to-DC voltage converter 100 including the disclosed soft-start controller 106 in accordance with various embodiments. The converter 100 is a buck converter and includes an error amplifier 102, a control logic 104, a first switch M1, a second switch M2, a second soft start controller 108, and the soft start controller 106. The first switch M1 is generally referred to as a high side switch, and is connected to the input voltage $V_{in}$ and a common node $V_{sw}$. As mentioned above, M1 is configured to couple the input voltage $V_{in}$ to an output voltage node $V_o$. The second switch M2 is referred to as a low side switch, and is connected to the common node $V_{sw}$ and ground. M2 is configured to couple ground to the output voltage node $V_o$. The voltage converter 100 further includes an inductor L1 connected between the common node $V_{sw}$ and the output voltage node $V_o$, wherein current flowing through the inductor L1 is the load current of the voltage converter 100. More specifically, the voltage converter 100 includes a high-side current sensor 130 and a low-side current sensor 140 that is coupled to the first switch M1 and the second switch M2 respectively.

In a preferred embodiment, the output voltage node $V_o$ is coupled to an input of the error amplifier 102, thereby forming a feedback loop as shown in FIG. 1. Further, as shown in FIG. 1, the signal 103 is also coupled to the soft-start controller 106. The disclosed embodiment is preferably used in a DC-to-DC buck converter, which means that a voltage level at the output voltage node $V_o$ is smaller than the input voltage $V_{in}$.

Still referring to FIG. 1, the high side and low side switches M1 and M2 are respectively controlled by PWM signals 105 and 107 that are provided by the control logic 104. The soft start controller 106 is configured to couple to the control logic 104 and the output voltage node $V_o$. More specifically, the error amplifier 102 includes three inputs coupled to three voltage nodes: $V_{ref}$, $V_{fb}$, and $V_{ss}$, wherein voltage levels at $V_{ref}$, $V_{fb}$, and $V_{ss}$ respectively represent a reference voltage, a feedback voltage, and a soft start voltage. For ease of reference, $V_{ref}$, $V_{fb}$, and $V_{ss}$ represent the voltage levels at the respective inputs of the error amplifier 102 hereinafter. Although a source to supply $V_{ref}$ is not shown in FIG. 1, in some preferred embodiments, $V_{ref}$ may be provided by a current/voltage source integrated in or with the voltage converter 100. In a preferred implementation, $V_{fb}$ is provided via signal 103, which means that $V_{fb}$ equals the voltage level at the output voltage node $V_o$, or in an alternate implementation, $V_{fb}$ equals a partial ratio of the voltage level at the output voltage node $V_o$ if there is a voltage/current divider between the output voltage node $V_o$ and the input $V_{fb}$. No voltage/current divider is shown in the example of FIG. 1 for ease of illustration, but a divider may be provided in other examples. In a preferred embodiment, $V_{ss}$ may be generated via the second soft start controller 108 to charge a capacitor (not shown) coupled to the second soft start controller 108. Details of how the soft-start controller 106 operates with respect to the signal 103 and how the soft start controller 106 and the second soft start controller 108 are implemented in the voltage converter 100 will be provided below.

Continuing with FIG. 1, the reference voltage $V_{ref}$ generally represents a desired voltage level for the output voltage node $V_o$ to reach. In other words, before the startup of the voltage converter 100, there may be a pre-biased voltage level at the output voltage node $V_o$. This pre-biased voltage level may not be equivalent to the desired voltage level $V_{ref}$. As such, the voltage converter 100 is configured to function as a voltage regulator, usable to ramp up the voltage level at $V_o$ from an initial bias voltage to $V_{ref}$. During the startup of the voltage converter 100, $V_{ss}$ ramps up from zero, and is configured to guide $V_{fb}$ (i.e., the voltage level at the output voltage node $V_o$ in the current embodiment) to ramp up from either zero or the pre-biased voltage level to the desired reference voltage level $V_{ref}$. In order to have the monotonic startup behavior of the output voltage level, that is, $V_{fb}$ ramping up monotonically to the desired voltage level and simultaneously avoid causing the disablement of the current sensor (e.g., 140) coupled to the low side switch M2, the soft start controller 106 preferably is implemented so as to cause the control logic 104 to provide a corresponding control signal 107 that assures the low-side current sensor 140_actively monitors the load current (i.e., the current flowing through the inductor L1). Details of the duty cycles associated with the control signals 105 and 107 will be discussed in FIG. 3 and FIG. 4.

Figure 2:
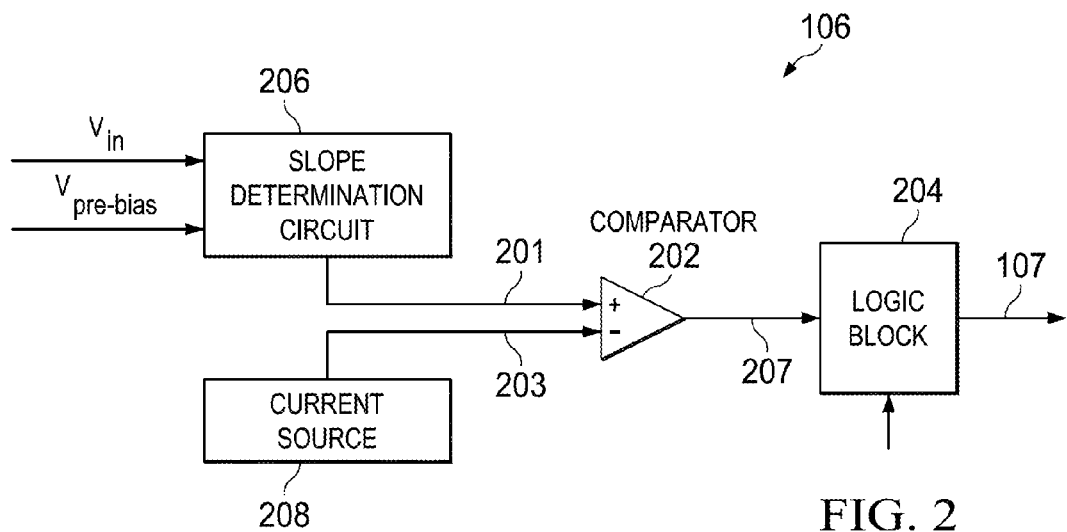
FIG. 2 shows a block diagram to further illustrate a soft start controller in accordance with various embodiments.

FIG. 2 shows an exemplary block diagram of the soft-start controller 106 in accordance with various embodiments. The soft start controller 106 includes a comparator 202, a logic block 204, a slope determination circuit 206, and a current source 208. The slope determination circuit 206 is configured to receive $V_{in}$ and $V_{pre-bias}$ and to process $V_{in}$ and $V_{pre-bias}$ so as to generate a signal 201, $V_{in}-V_{pre-bias}$, wherein $V_{pre-bias}$ represents the pre-biased voltage level at the output voltage node $V_o$ (i.e., signal 103). As such, a slope of a ramp up of the signal may be determined by the slope determination circuit 206. More specifically, the slope is proportional to a difference value between $V_{in}$ and $V_{pre-bias}$ (i.e., $V_{in}-V_{pre-bias}$). Depending on the received values of $V_{in}$ and $V_{pre-bias}$, the slope may change in accordance with the difference value between $V_{in}$ and $V_{pre-bias}$.

Further, the current source 208 is configured to generate a sawtooth signal 203. The comparator 202 receives as inputs: $V_{in}-V_{pre-bias}$ 201 and the sawtooth signal 203 from the slope determination circuit 206 and the current source 208 respectively. Then the comparator 202 compares the signals 201 and 203 to output a signal 207. The signal 207 may be a PWM signal. Based on the signal 207, the logic block 204 is to produce the control signal 107 that includes the duty cycle (low side duty cycle) to control the low side switch M2 during the soft start phase. In a preferred embodiment, the logic block 204 coupled to the comparator 202 may be a separate control logic different from the control logic 104 in FIG. 1, or the logic block 204 may be included as part of the control logic 104 (i.e., one logic block that performs the functions of control logic 104 and logic block 204). The logic block 204 is configured to provide the control signal 107 to drive the low side switch M2.

Figure 3:
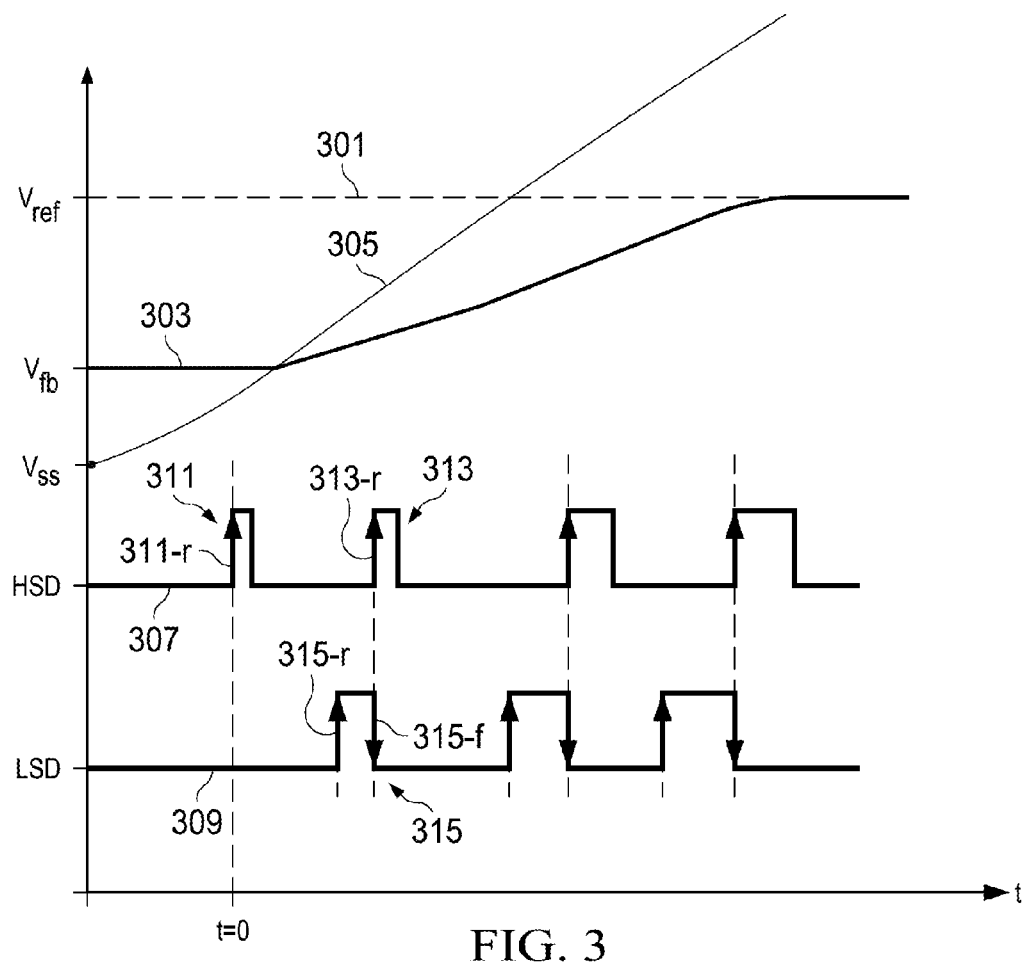
FIG. 3 shows exemplary waveforms of various signals to illustrate a soft start process of a DC-to-DC voltage converter in accordance with various embodiments.

FIG. 3 shows an example of the voltage level at the output voltage nodes $V_o$ varying with the duty cycles of the signals 105 and 107 in accordance with various embodiments. As shown in FIG. 3, signals 301, 303, and 305 respectively represent $V_{ref}$, $V_{fb}$, and $V_{ss}$, and signals 307 and 309 (i.e., the PWM signals) represent the control signals 105 and 107 respectively. Each of the control signals 105 and 107 has a variable duty cycle. In FIG. 3, the duty cycle of the signal 307 (i.e., the control signal to control the high side switch M1) is referred to as "HSD," and the duty cycle of the signal 309 (i.e., the control signal to control the low side switch M2) is referred to as "LSD." In a preferred embodiment, signals 301~309 are time-varying signals.

At the initialization (i.e., startup) of the voltage converter 100, the time begins at t=0. In the example of FIG. 3, during the startup, the voltage converter 100 is pre-biased, thus resulting in a nonzero $V_{fb}$ at t=0 as shown in FIG. 3. As mentioned above, the soft start voltage $V_{ss}$ always ramps up from zero to initialize the soft start process. Typically, the soft start process ends at the moment that the soft start voltage $V_{ss}$ is greater than a predefined voltage level $V_{ref}$. The moment when the soft start ends is preferably determined by the error amplifier 102. For example, the error amplifier 102 may be configured to compare the received voltage levels $V_{ref}$ and $V_{ss}$ so as to be aware of whether the received $V_{ss}$ is greater than the predefined voltage level $V_{ref}$. In a preferred embodiment, this predefined voltage level is set, by a user, to be greater than the reference voltage $V_{ref}$ in order to assure the soft start process is successfully performed by the soft start controller 106. Additionally or alternatively, in a preferred embodiment, the second soft start controller 108 may be configured to provide $V_{ss}$ so as to end the soft start process while the second soft start controller 108 determines that $V_{ss}$ is greater than the predefined voltage level.

As is seen in FIG. 3, the width of the pulses of signal 307 (control signal 105) increases with each successive pulse while the period remains the same. As such, during the soft start process, the HSD gradually increases from a small value of the duty cycle (e.g., 311). In a preferred embodiment, the HSD is controlled by a second soft start controller 108 which is different from the soft-start controller 106. The second soft start controller 108 is generally coupled to the high side switch M1 and may be integrated into or separated from the control logic 104. Conventionally, control of the LSD is tied to the HSD even during the soft start process, that is, LSD=1−HSD, but it may result in a non-monotonic startup behavior of the voltage converter especially when the voltage converter is pre-biased. Thus, the disclosed embodiment implements the soft start controller 106 to control the LSD independently during the soft start process instead of being controlled based on the HSD, and once the soft start process ends, in a preferred embodiment, the LDS may change in accordance with the HSD (i.e., LSD=1−HSD).

Moreover, the soft start controller 106 aligns a falling edge (e.g., 315-f) of the control signal 309 with a rising edge (e.g., 313-r) of the control signal 307. As such, current sensors (e.g., 130 and 140) used to sense overcurrent flowing through a load of the voltage converter 100 (e.g., inductor current) is always enabled during a full cycle (from 311-r to 313-r) of the signal 307. Generally, each of the switches M1 and M2 is coupled to a respective current sensor. The current sensor coupled to the high side switch M1 is configured to sense a peak value of the current flowing through the load, and the current sensor coupled to the low side switch M2 is to sense a valley value of the load current. More specifically, each of the current sensors is only enabled to sense the current while the coupled switch is on. Thus, aligning the falling edge (e.g., 315-f) of the signal 309 with the rising edge (e.g., 313-r) of the signal 307 assures that before a next cycle of the signal 307 starts, the low side current sensor is active and enabled to sense a presence of overcurrent.

Figure 4:
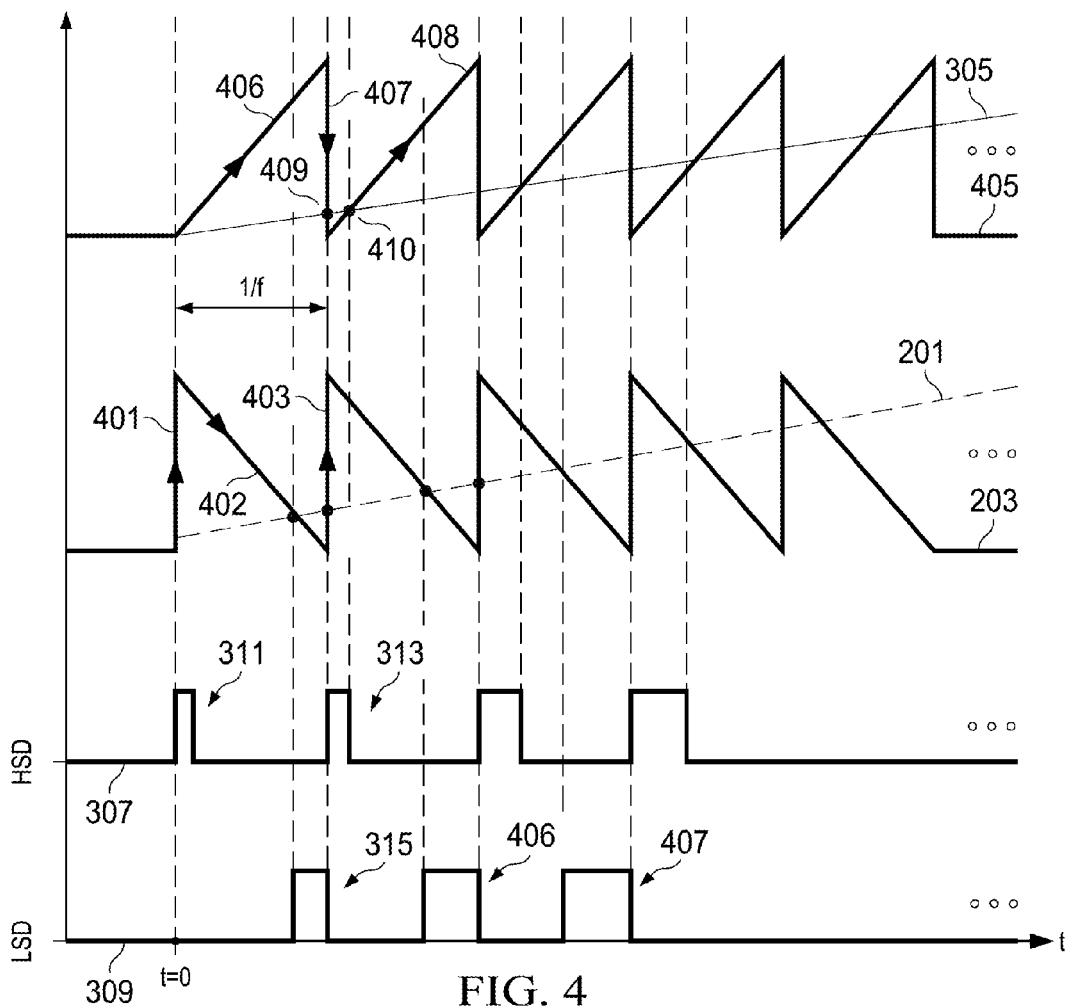
FIG. 4 shows exemplary waveforms of various signals to explain how a slope to ramp up a soft start voltage during a soft start process is determined in accordance with various embodiments.

FIG. 4 shows an example to further determine the LSD during the soft start process by comparing a variable slope of a ramp up of $V_{in}$-$V_{pre-bias}$ with a sawtooth signal in accordance with various embodiments. FIG. 4 includes waveforms of six signals: the soft start voltage $V_{ss}$ 305, a sawtooth signal 405, the $V_{in}$-$V_{pre-bias}$ 201, the sawtooth signal 203, the PWM signals 307 and 309 representing the control signals 105 and 107 respectively. These six waveforms all start from the beginning of time (t=0). As described in the block diagram with respect to FIG. 2, the sawtooth signal 203 is preferably generated by the current source 208 of the soft start controller 106. More specifically, each of the sawtooth signals 203 and 405 is a series of ripple signals with a period (i.e., 1/f as shown in FIG. 4, wherein "f" may be frequency of the control signals 105 or 107). More particularly, each ripple signal includes a rising edge and a falling edge, and the period of each sawtooth signal may be determined by a clock of the voltage converter 100. For example, the sawtooth signal 203 includes a rising edge 401, a falling edge 402, and the sawtooth signal 405 includes a rising edge 406, and a falling edge 407. In a preferred embodiment, the period for each of the sawtooth signals 405 and 203 is the same, that is, 1/f as shown in FIG. 4.

Still referring to FIG. 4, a value of the duty cycle for the signal 309 (i.e., the control signal 107 for the low side switch M2) may be determined based on the slope as well. After the slope of $V_{in}$-$V_{pre-bias}$ has been determined by the slope determination circuit 206, multiple intersections of the signal 201 and the sawtooth signal 203 are generated via comparing these two signals. More specifically, as shown in FIG. 4, the falling edge 402 and a rising edge 403 of the sawtooth signal 203 intersect with the signal 201 at two points 404 and 405. In a preferred embodiment, a time portion from the point 404 to 405 may be defined as the active time portion of the LSD (e.g., 315), which means that the duty cycle of the signal 309 is determined, by the soft-start controller 106, based on comparing the sawtooth signal 203 and $V_{in}$-$V_{pre-bias}$.

Analogously, a value of the duty cycle for the signal 307 (i.e., the control signal 105 for the high side switch M1) may be determined based on the $V_{ss}$ and the sawtooth signal 405. In a preferred implementation, the value of the duty cycle for the signal 307 may be determined by the second soft start controller 108. More specifically, via comparing, by the second soft start controller 108, the $V_{ss}$ and the sawtooth signal 405, there are several intersections shown in FIG. 4, for example, points 409 and 410. Point 409 is the intersection of the falling edge 407 and the $V_{ss}$, and point 410 is the intersection of a next rising edge 408 of the sawtooth signal 405. As such, a time portion from the point 409 to point 410 may be determined by the second soft start controller 108 as an active time portion of the HSD (e.g., 307), which means that the duty cycle of the signal 307 is determined, by the second soft start controller 108, based on comparing the sawtooth signal 405 and $V_{ss}$.

Figure 5:
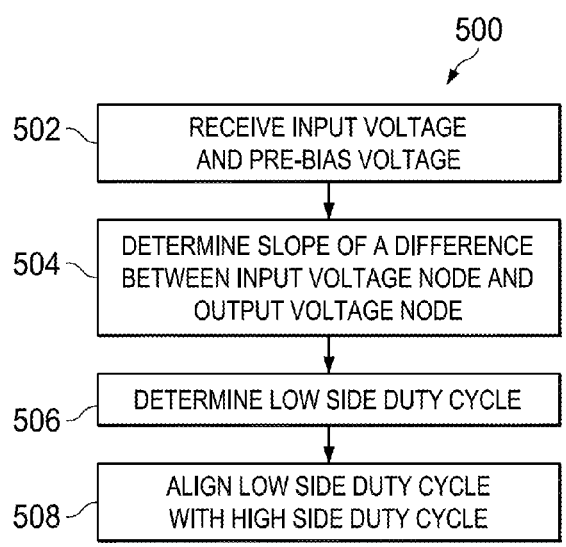
FIG. 5 shows a flow chart to determine a low side duty cycle during a soft start process of a DC-to-DC voltage converter in accordance with various embodiments.

FIG. 5 shows a flow chart 500 to determine a low side duty cycle during a soft start process of the voltage converter 100 in accordance with various embodiments. At the beginning of the soft-start process (i.e., the startup of the voltage converter 100), the flow chart initializes at block 502 with receiving, by the soft start controller 106, the input voltage $V_{in}$ and the voltage level at the output voltage node $V_o$ of the voltage converter 100. In a preferred embodiment, the input voltage and the voltage level at the output voltage node are received by the slope determination circuit 206, and if the voltage converter 100 is pre-biased, the voltage level at the output voltage node $V_o$ is preferably referred to as $V_{pre-bias}$.

The flow chart 500 continues at block 304 with determining, by the slope determination circuit 206, a slope of a line that represents the difference between $V_{in}$ and $V_{pre-bias}$ that is $V_{in}$-$V_{pre-bias}$, wherein $V_{in}$-$V_{pre-bias}$ ramps up from zero during startup of the voltage converter 100. After the slope has been determined by the soft start determination circuit 206, the flow chart 500 continues at block 506 with determining a value of the duty cycle for the control signal 107 to drive the low side switch M2. The determining of the value of the low side duty cycle may further include comparing a sawtooth signal (e.g., 203) and the voltage difference between the input voltage $V_{in}$ and the voltage level at the output voltage node $V_o$ (e.g., 201).

Still referring to FIG. 5, the flow chart 500 continues to block 508 with aligning a falling edge of the low side duty cycle (e.g., 315-f) with a rising edge of a high side duty cycle (e.g., 313-r). More specifically, the high side duty cycle may be determined by the second soft start controller 108, which is different from the soft start controller 106 in the current embodiment. After the soft start process, in spite of being not shown in the flow chart 500, the control of the low side duty cycle is released from the soft start controller 106, and the low side duty cycle changes accordingly with the high side duty cycle. More specifically, the low side cycle equals one minus the high side duty cycle, that is, the low side duty cycle=1−the high side duty cycle.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A DC-to-DC converter, comprising:
a first switch connected to an input voltage node and a common node, the first switch configured to provide a signal path between the input voltage node and an output voltage node of the DC-to-DC converter through the common node when the first switch is turned on;
a second switch connected to a ground node and the common node, the second switch is configured to provide a signal path between the ground node and the output voltage node of the DC-to-DC converter through the common node when the second switch is turned on; and a control logic coupled to the first and second switches, the control logic configured to provide a first control signal and a second control signal to control the first and the second switches respectively, wherein a falling edge of the second control signal is aligned with a rising edge of the first control signal and a duty cycle of the second control signal is varied over time in a non-complementary manner when compared with a duty cycle of the first control signal while a voltage level of a first node of the DC-to-DC converter is less than a predefined level, the first node is a soft start voltage node.

2. The DC-to-DC converter of claim 1 further comprising: the first node configured to produce a first voltage that ramps up from zero during initialization.

3. The DC-to-DC converter of claim 2 further comprising: a first soft start controller coupled to the control logic, the first soft start controller configured to control the duty cycle of the second control signal.

4. The DC-to-DC converter of claim 3, wherein while the first voltage is less than the predefined level, the first soft start controller is configured to determine the duty cycle of the second control signal based on a slope, wherein the slope is based on a difference between an input voltage of the input voltage node and a non-zero voltage level of the output voltage node.

5. The DC-to-DC converter of claim 4, wherein the first soft start controller comprises a comparator configured to compare the slope with a sawtooth signal to determine the duty cycle of the second control signal.

6. The DC-to-DC converter of claim 3 further comprising: an inductor connected to the common node and the output voltage node, wherein the first soft start controller controls the second control signal to enable current flowing through the inductor to be sensed by a first current sensing circuit and a second current sensing circuit coupled to the first and second switches respectively.

7. The DC-to-DC converter of claim 3, wherein, when the first voltage reaches the predefined level, the duty cycle of the second control signal is varied with a duty cycle of the first control signal in a complementary manner, and wherein the first control signal is controlled by a second soft start controller.

8. The DC-to-DC converter of claim 1, wherein the first and second control signals are pulse width modulated signals, each of which is associated with a duty cycle of the respective switch.

9. A voltage regulator, comprising:
a first switch connected to an input voltage node and a common node, the first switch is configured to provide a signal path between the input voltage node and an output voltage node of the voltage regulator through the common node when the first switch is turned on;
a second switch connected to a ground node and the common node, the second switch configured to provide a signal path between the ground node and the output voltage node of the voltage regulator through the common node when the second switch is turned on;
a control logic configured to provide a first and a second control signals to control the first and second switches respectively;
a first soft start controller coupled to the control logic and configured to determine the second control signal while a first voltage is less than a predefined level, the first voltage ramps up from zero during initialization; and a second soft start controller coupled to the control logic, and configured to determine the first and second control signals while the first voltage is greater than the predefined level;
wherein a falling edge of the second control signal is aligned with a rising edge of the first control signal and a duty cycle of the second control signal is varied over time in a non-complementary manner when compared with a duty cycle of the first control signal while the first voltage is less than the predefined level.

10. The voltage regulator of claim 9, wherein the first and second control signals are pulse width modulated signals, each of which is associated with a duty cycle of the respective switch.

11. The voltage regulator of claim 10, wherein the first soft start controller is configured to determine the duty cycle of the second control signal based on a slope, wherein the slope is proportional to a difference between a voltage level at the input voltage node and a voltage level at the output voltage node.

12. The voltage regulator of claim 11, wherein the first soft start controller further comprises a comparator configured to compare the slope with a sawtooth signal to determine the duty cycle of the second control signal.

13. The voltage regulator of claim 9 further comprising: an inductor coupled to the output voltage node, wherein the first soft start controller controls the second control signal to enable current flowing through the inductor to be sensed by a first current sensing circuit and a second current sensing circuit coupled to the first and second switches respectively.

14. The voltage regulator of claim 9, wherein when the first voltage reaches the predefined level, the duty cycle of the second control signal is varied with a duty cycle of the first control signal in a complementary manner.

15. A method, comprising:
receiving, by a soft start controller, voltage levels at an input voltage node and an output voltage node of a DC-to-DC converter;
determining, by the soft start controller, a duty cycle of a low side control signal for controlling a low side switch of the DC-to-DC converter;
controlling, by the soft start controller, a falling edge of the low side control signal to align with a rising edge of a high side control signal, the high side control signal being used to control a high side switch of the DC-to-DC converter; and
varying the duty cycle of the low side control signal over time in a non-complementary manner when compared with a duty cycle of the high side signal while a voltage level of a first node of the DC-to-DC converter is less than a predefined level, the first node is a soft start voltage node.

16. The method of claim 15, wherein the duty cycle of the low side control signal is determined based on a slope, wherein the slope is proportional to a difference between the voltage level at the input voltage node and the voltage level at the output voltage node.

17. The method of claim 15, wherein the duty cycle of the low side control signal is varied in a complementary manner when compared to the duty cycle of the high side signal when the voltage level of the first node of the DC-to-DC converter is greater than the predefined level.

* * * * *